UNITED STATES PATENT OFFICE.

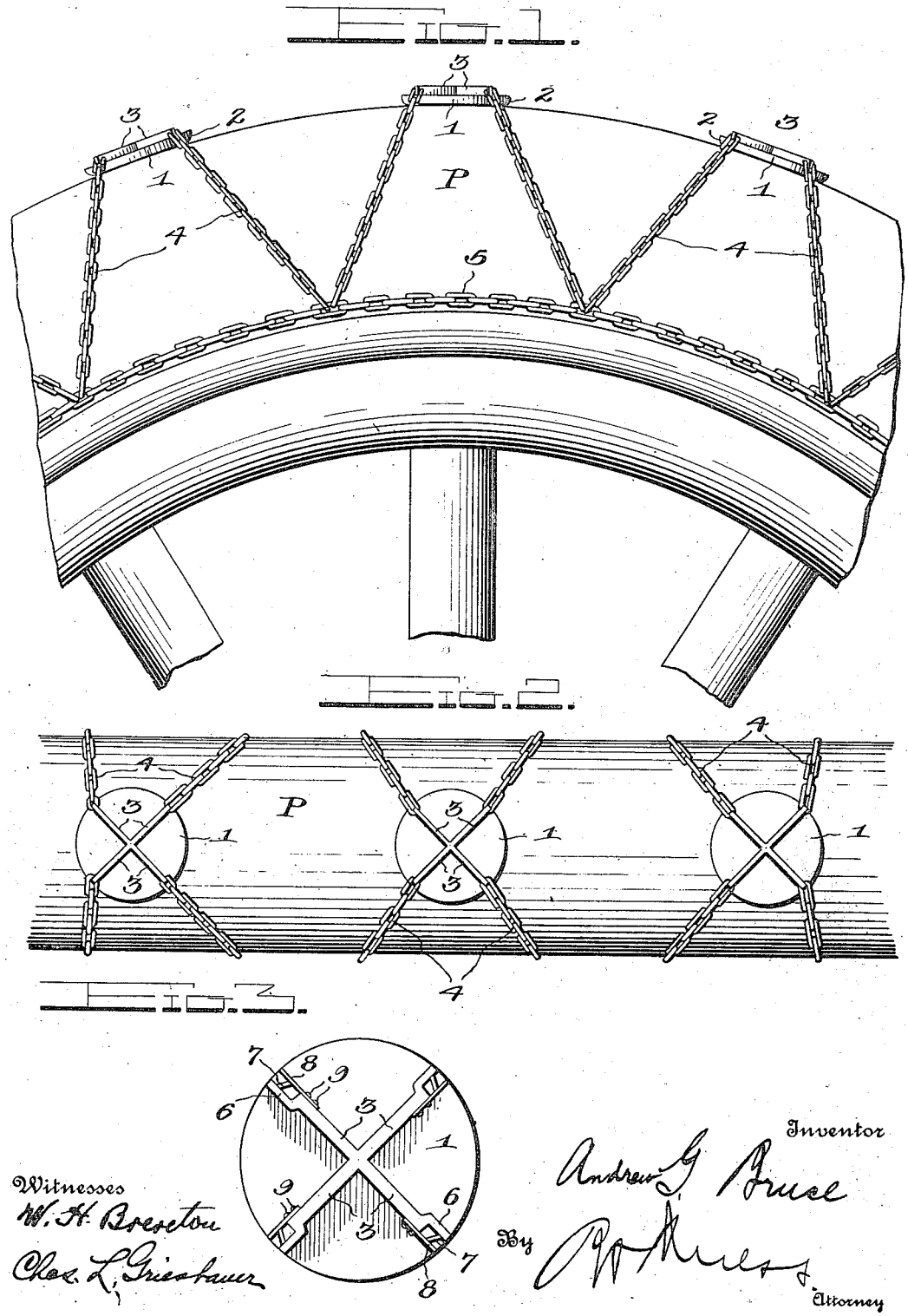

ANDREW G. BRUCE, OF MEAD, NEBRASKA.

ANTISKID ATTACHMENT FOR TIRES.

1,138,189.        Specification of Letters Patent.        Patented May 4, 1915.

Application filed July 2, 1914. Serial No. 848,624.

*To all whom it may concern:*

Be it known that I, ANDREW G. BRUCE, a citizen of the United States, residing at Mead, in the county of Saunders and State of Nebraska, have invented new and useful Improvements in Antiskid Attachments for Tires, of which the following is a specification.

This invention relates to certain new and useful improvements in anti-skid attachments for tires, and the primary object thereof is to provide an attachment which embodies means of novel construction which contact with the surface of the road being traveled and which prevents the chains that are employed to secure the aforementioned means to the tire from contacting with the tread of the tire, so as to prevent the chains from having abrading action on the tire.

The invention has for its further objects to simplify anti-skid devices, and economize in the construction thereof, and to otherwise generally improve attachments of the character mentioned.

In the drawings: Figure 1, is a fragmentary side elevation of a wheel having the present invention applied thereto; Fig. 2 is a top plan view; and Fig. 3 is a detail view showing a modified form of cap or disk in top plan.

The invention includes a series of caps or disks 1, which seat on their lower faces upon the tread portion of the tire P, the lower faces of the caps or disks having their peripheral portions rounded at 2 so as to eliminate any sharp edges which would, if present, bite into the tire. The upper face of each disk 1, is provided with ribs 3 which project outwardly and are preferably arranged at right angles to each other to thus present a substantially X shape arrangement or formation. The outer free end of each rib is perforated to receive the respective lateral chains 4 which latter are also arranged in a somewhat X formation, and are connected at their opposite ends to chains 5 which extend circumferentially of the wheel and on opposite sides of the latter.

It will be apparent from the above that the several chains and the disks which are connected thereto may creep circumferentially of the tire so as to not subject the tire to continual wear at fixed points of the disks 1.

For the purpose of enabling the disks to be easily and quickly applied to and removed from the respective attaching chains 4, I employ a modified form of disk shown in Fig. 3 of the drawing, in which the general structure and arrangement of the ribs and disks remain the same, excepting that the ribs are each provided with lateral offset ends 6, and a diagonal pin 7, rigidly secured to each of the offset ends 6, so that the chains may be placed over the pins 7, and are held against accidental displacement by flat springs 8, which latter are riveted or otherwise suitably secured at 9, to the sides of the ribs opposite to the sides that are offset. The springs 8 are free or unattached at their outer ends, so that the operator may simply grasp the free ends of the springs with his fingers and move same away from the pins 7 to thus allow the links of the chains to be placed over the pins, whereupon the springs are released and instantly return to positions in engagement with the pins 7. It will thus be apparent that the offset ends 6 and the springs 7 provide pockets in which the chain ends are received. By diagonal disposition of the pins 7, the latter are enabled to more effectually resist the pull of the chains.

It will also be apparent from the above that the extreme outer ends of the chains 4 will also contact with the surface of the road and thus assist the anti-skid properties of the disks and more particularly the ribs thereon.

What is claimed is:

1. In an anti-skid attachment for tires, a series of disks seating on the tread thereof, each disk having a pair of ribs formed integral therewith, said ribs intersecting each other centrally, and having their ends substantially flush with the peripheries of the disks, said ribs having perforations formed in their free outer ends, chain sections having one of their ends engaged in said perforations and disposed transversely of the sides of the tire, and chains disposed circumferentially of the tire and to which the other ends of the chain sections are secured to hold said disks on the tire tread.

2. In an anti-skid attachment for tires, a series of disks seating on the tire tread, ribs on the disks having offset outer ends and having pins which are connected to said offset ends and extend laterally of the latter, chains extending laterally of the tire and engaged with the pins, and flat springs connected to the ribs and engaged with the free ends of the pins, the offset ends and the springs forming pockets in which the chain ends engage, and means to hold said chains over the tire.

In testimony whereof I have hereunto set my hand in presence of two subscribing witnesses.

ANDREW G. BRUCE.

Witnesses:
J. HUFFMAN,
J. B. SWEET.